A. W. BROWN.
AUTOMATIC WEIGHING SCALE.
APPLICATION FILED JULY 31, 1914.
1,233,641.
Patented July 17, 1917.
2 SHEETS—SHEET 2.
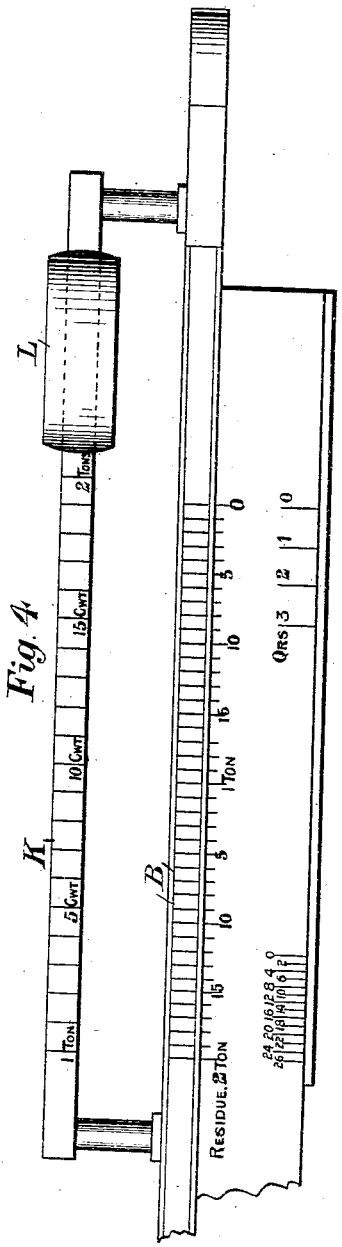
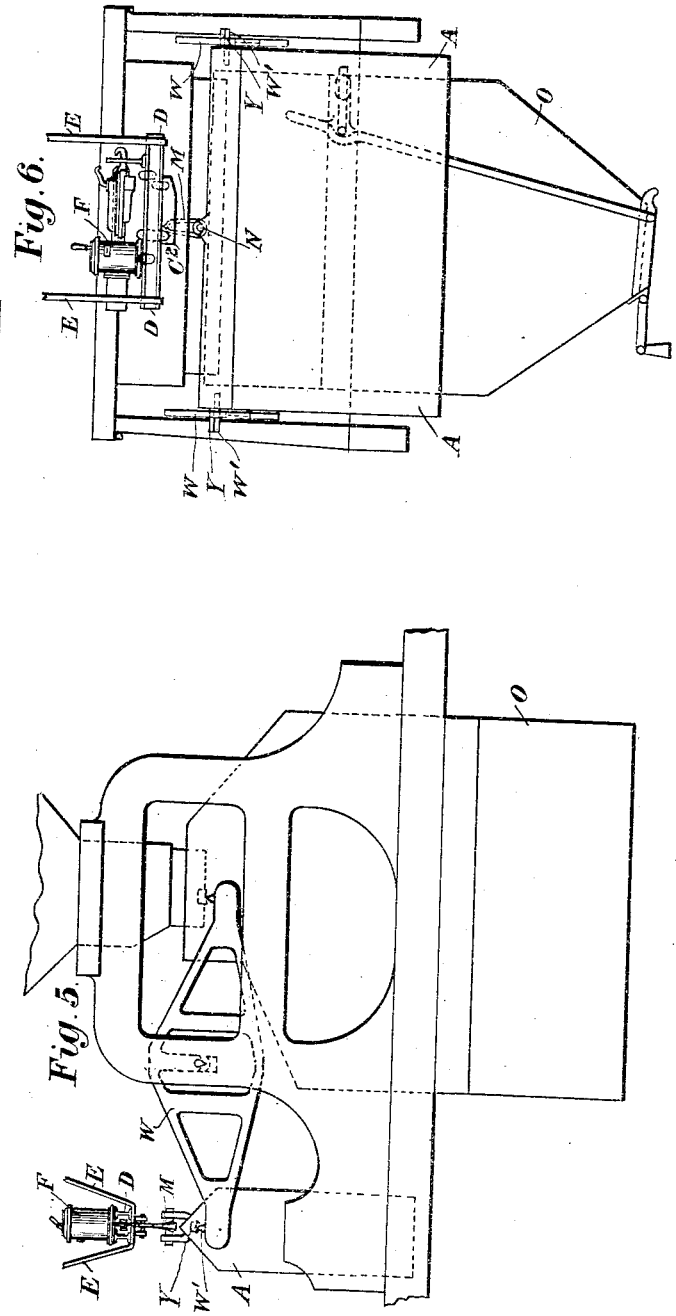
Witnesses:
Anna Cooper.
James F. Mullaly.
Inventor:
Alfred W. Brown
by Finckel & Finckel
Attorneys

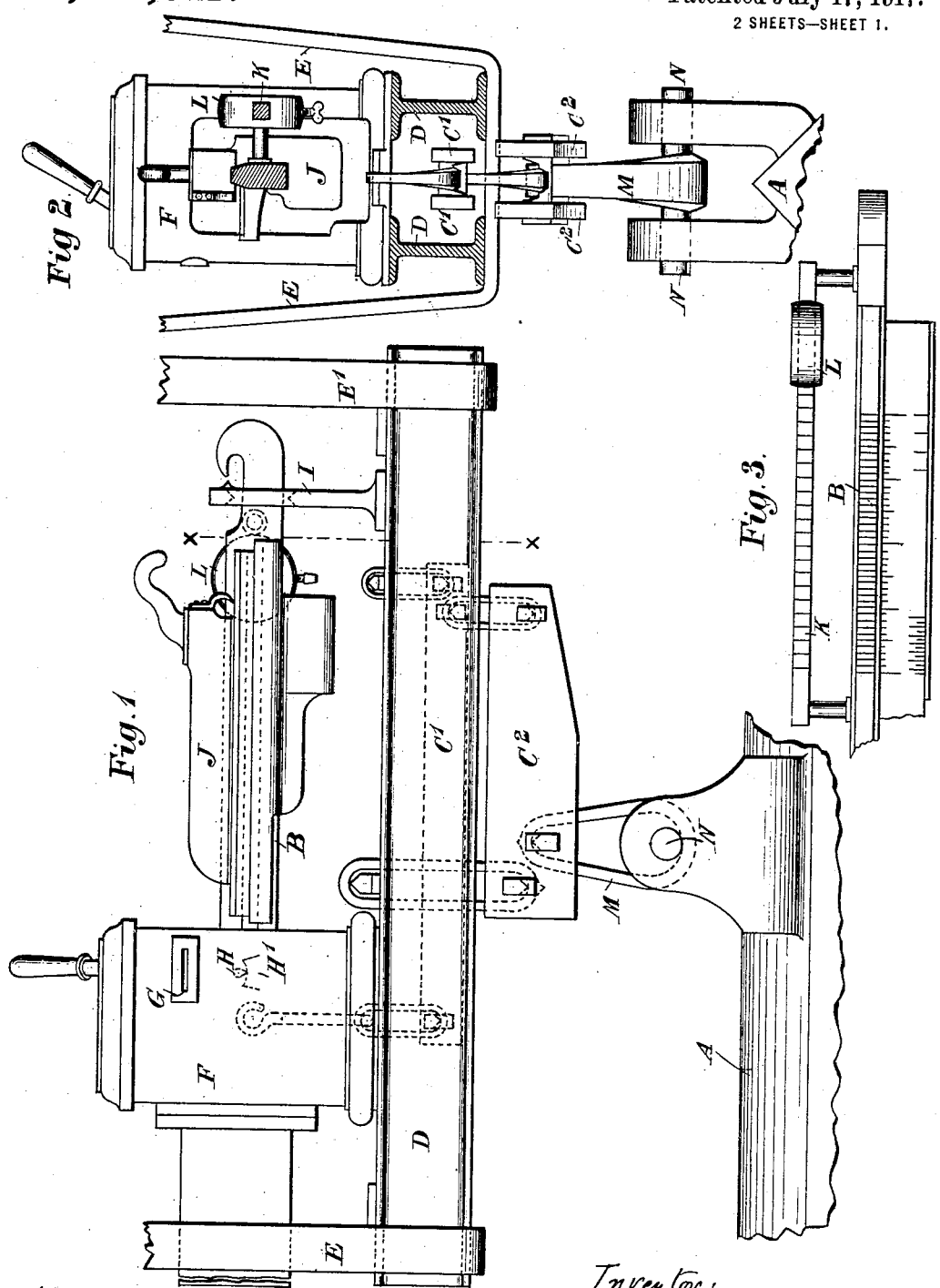

UNITED STATES PATENT OFFICE.

ALFRED W. BROWN, OF SMETHWICK, ENGLAND, ASSIGNOR TO W. & T. AVERY, LIMITED, OF SMETHWICK, ENGLAND.

AUTOMATIC WEIGHING-SCALE.

1,233,641.      Specification of Letters Patent.      Patented July 17, 1917.

Application filed July 31, 1914. Serial No. 854,331.

*To all whom it may concern:*

Be it known that I, ALFRED WILLIAM BROWN, a subject of His Majesty the King of Great Britain and Ireland, residing at Soho Foundry, Smethwick, in the county of Stafford, England, have invented certain new and useful Improvements in Automatic Weighing-Scales, of which the following is a specification.

This invention relates to improvements connected with automatic weighing scales.

The object of this invention is to provide an improved mechanism for weighing and recording the residue in automatic scales of the type employed for weighing grain, coal, or the like, said mechanism being equally applicable for weighing and recording the residue in conjunction with scales having a variable capacity.

My invention comprises a residue steelyard having poise weights thereon, said poise weights being connected in known manner with printing or recording mechanism to impress the weight upon a tape or ticket. A portion of the said steelyard or a supplementary bar attached thereto is also provided with a poise weight. The said poise weight upon the steelyard portion or supplementary bar is arranged to be used relatively to the residue poise weights upon the steelyard. The steelyard is graduated in a reverse direction to the ordinary way, and the supplementary bar or the like is graduated in a contra direction to the steelyard within the range of capacities determined for the automatic scale.

The steelyard and consequently the supplementary bar are connected to the weight box side of the weigh beam of the automatic scale by any suitable means, said connection being put in or out of gear with the weigh beam as desired, that is, when weighing a residue the connection is made between the weigh beam and the steelyard, but when the scale is operating under normal conditions the steelyard is disconnected from the residue mechanism.

The method of operation of this mechanism is as follows:—

Assuming the maximum capacity of the automatic scale to be two tons, the residue steelyard would be graduated reversely from zero to two tons, and assuming the load or capacity limits of the scale may vary between one ton and two tons, the supplementary bar or the like would be graduated from one ton to two tons in the reverse direction to that of the steelyard. If the scale be set to weigh two ton loads the residue steelyard poise weights would be set at the two ton graduation and on the supplementary bar the load poise would be at its two ton graduation, the steelyard would then be in equilibrium with two tons of weights in the weight box and two tons of grain or the like in the weigh hopper. Should the loads to be weighed be one ton each, the supplementary or load poise would be moved backward on the bar to the one ton graduation and the weights in the weight box reduced to one ton, the steelyard would then be out of balance until the residue poise weights were moved to the one ton graduation, the scale when in balance would now show one ton of residue in the weigh hopper.

With the aforesaid mechanism and arrangement thereof, it is possible to weigh and record the amount of the residue whether weighing maximum loads, or any other lesser weights, within the range for which it is constructed, provided the load poise on the supplementary bar is secured in a position equivalent to the load being weighed. Further supposing it to be possible when weighing one ton loads that two tons of the grain should be supplied to the weigh hopper, the steelyard would then show two tons residue, as the poise weights would have to be moved back to the two tons graduation to bring the steelyard into equilibrium. To meet such contingency the back knife edge of the steelyard and also the intermediate levers would require to be double acting, as however this is such a remote contingency it can be practically disregarded.

In order that my invention may be readily understood and carried into effect, I will now proceed to describe the same fully with reference to the accompanying drawings in which:—

Figure 1 is a front elevational view of the steelyard showing the connection of the residue weighing steelyard with the weight box through the medium of the intermediate levers.

Fig. 2 is a sectional end elevation of Fig. 1 on line X X.

Fig. 3 is a plan view of a portion of the steelyard, showing the connection of the supplementary load bar with the residue steelyard, the load poise alone is shown and not the main and smaller poises of the residue steelyard.

Fig. 4 is an enlarged view of Fig. 3, showing the graduations arranged for a maximum of two tons residue, and the graduations of the supplementary load bar graduated from the maximum of two tons to a minimum of one ton.

Figs. 5 and 6 are front and end views respectively of the complete automatic scale showing the connection of the residue weighing mechanism with the weight box.

Referring to these drawings wherein like letters of reference indicate corresponding parts A is the ordinary weight box of an even-armed beam of a known type of automatic scale connected to the residue steelyard B by means of the intermediate levers $C^1$ and $C^2$, said levers being freely suspended from the frame D by the usual knife edges and linkage.

The frame D is suspended from any convenient overhead support by the straps E and $E^1$.

Upon the frame D is mounted the pillar F, in this case of the type for obtaining a printed impression of the weight by the insertion of a ticket in the slot G. The fulcra knife edges H of the steelyard B are supported in the bearings $H^1$ in the usual manner. The upward movement of the steelyard B is controlled in the usual manner by the carrier or bracket I.

The reading of the major graduations of the residue steelyard B are obtained by the adjustment of the main poise J, and the adjustment of the smaller poises, not shown, in the manner well known.

Attached to the residue steelyard B is the supplementary or load bar K, the graduations of which are in the reverse direction to those of the residue steelyard B, and the load poise L traverses the load bar K.

The residue weighing mechanism is connected to the weight box A, by means of the link M, and the pin or bolt N, when it is required to weigh the residue; but in the ordinary working of the automatic scale, the pin or bolt N, is withdrawn so that the residue weighing mechanism is quite disconnected from the weight box A, the said box then being suspended from the weigh-beam W. The box A is provided as usual with bearing-blocks Y which rest on the usual end knife-edges $W^1$ of the weigh-beam W. When the weight-box is transferred to the residue steelyard, as described, the blocks Y move temporarily upward with the weight-box and slightly away from the end knife-edges $W^1$, but the loaded weigh hopper O suspended from the opposite end of the weigh-beam to that of the weight-box causes the beam to rock about its fulcrum and the end knife-edges $W^1$ of the weigh-beam thereby to follow the upward movement of the bearing blocks Y.

To weigh the residue when the scale is weighing loads of the maximum capacity of 2 tons the load poise L would be fixed and secured at the 2 ton graduation upon the load bar K, the weight of the residue in the grain hopper O would then be obtained by moving the poises upon the residue steelyard B until equilibrium be obtained, the readings would then give the weight of the residue in the grain hopper O, but when the loads being weighed are less than the maximum capacity say 1 ton the load poise L, would be moved to the 1 ton graduation upon the supplementary load bar K, and secured, the poises upon the residue steelyard B, then being adjusted to obtain equilibrium will then give the correct reading of the weight of the residue, for example, with 1 ton of weights in the weight box and 1 ton of grain in the grain hopper the steelyard would be in equilibrium with the load poise L, at the 1 ton graduation and the residue poise J at the 1 ton graduation thus indicating that the residue in the grain hopper is equal to the weight in the weight box.

It will therefore be seen that the steelyard will read accurately the amount of the residue whether weighing maximum loads or any lesser load within the range for which the scale is constructed.

Of course it will be understood that I do not confine myself to the particular type of scale and mechanism illustrated, and the graduations of the load bar, may instead of being on the supplementary bar as shown, be arranged upon a continuation of the steelyard itself, providing the graduations are in the reverse direction to those of the residue graduations.

What I claim as my invention and desire to secure by Letters Patent is:—

1. In an automatic weighing scale, the combination of a weigh-beam, a weigh-hopper for receiving the material to be weighed, a weight-box normally carried by the said weigh-beam, a steelyard and poise weights thereon adapted to weigh the residue, a supplementary load bar connected to the residue steelyard and graduated in a reverse direction to the graduations upon the said steelyard, a poise weight mounted on said supplementary load bar whereby the residue steelyard can be rebalanced to correspond to any alteration in the weighing capacity of the scale, and means for coupling and uncoupling the weight-box from said steelyard.

2. In an automatic weighing scale the combination of a weigh-beam, a weigh hopper for receiving the material to be weighed, a weight-box normally carried by the said weigh-beam, a steelyard and poise weights thereon adapted to weigh the residue, a supplementary load bar connected to said steelyard graduated in a reverse direction to the graduations upon the residue steelyard, a poise weight mounted on said load bar whereby the residue steelyard can be rebalanced to correspond to any alteration in the weighing capacity of the scale, means whereby said weight-box may be connected with said weigh beam or said residue weighing steelyard.

3. In an automatic weighing scale the combination of a weigh-beam, a weigh hopper for receiving the material to be weighed, a weight-box normally carried by the said weigh-beam, a steelyard and poise weights thereon adapted to weigh the residue, means for coupling and uncoupling the weight-box from the said steelyard whereby the said weight-box is alternatively dependent from the said weigh-beam or from the residue weighing steelyard, and means for obtaining a record of the weight of said residue.

In testimony whereof I affix my signature in presence of two witnesses.

ALFRED W. BROWN.

Witnesses:
GEORGE E. FOLKES,
ERNEST HARBER.

Copies of this patent may be obtained for five cents each, by addressing the "Commissioner of Patents, Washington, D. C."